(12) United States Patent
Carnevali

(10) Patent No.: US 6,561,476 B2
(45) Date of Patent: May 13, 2003

(54) POSITIVELY-POSITIONABLE MOUNTING APPARATUS

(76) Inventor: Jeffrey D. Carnevali, 3262-36 Avenue SW., Seattle, WA (US) 98126

( * ) Notice: Subject to any disclaimer, the term of this patent is extended or adjusted under 35 U.S.C. 154(b) by 0 days.

(21) Appl. No.: 09/855,162

(22) Filed: May 14, 2001

(65) Prior Publication Data

US 2002/0166936 A1 Nov. 14, 2002

(51) Int. Cl.⁷ ................................................. A47F 5/00
(52) U.S. Cl. ........................... 248/288.31; 248/181.1
(58) Field of Search .......................... 248/288.31, 145, 248/181.1, 181.2; 403/122, 141, 142, 143, 164, 165, 310, 338, 347, 374.3

(56) References Cited

U.S. PATENT DOCUMENTS

| | | | | |
|---|---|---|---|---|
| 483,311 A | * | 9/1892 | Remaly ...................... 172/740 |
| 596,729 A | | 1/1898 | White ........................ 403/56 |
| 855,149 A | | 5/1907 | Vaughn et al. | |
| 892,105 A | * | 6/1908 | White ........................ 248/60 |
| 973,319 A | * | 10/1910 | Morrill ...................... 248/230 |
| 1,280,013 A | | 9/1918 | Goddard .................. 248/288.5 |
| 1,359,645 A | | 11/1920 | Zink | |
| 1,455,441 A | | 5/1923 | Hodney ...................... 403/56 |
| 1,934,223 A | | 11/1933 | Booth | |
| 2,114,767 A | | 4/1938 | Hodney et al. ............. 248/481 |
| 2,121,317 A | | 6/1938 | Cohen ...................... 248/288.5 |
| 2,560,556 A | | 7/1951 | Creedon .................... 248/216 |
| 2,650,788 A | | 9/1953 | Hulstein .................... 248/181 |
| 2,710,609 A | | 6/1955 | Giller ........................ 403/141 |
| 3,096,061 A | | 7/1963 | Bertell ...................... 248/283 |
| 3,539,234 A | * | 11/1970 | Rapata ...................... 308/238 |
| 3,737,130 A | * | 6/1973 | Shiraish .................... 248/181 |
| 3,843,272 A | | 10/1974 | Jorn ........................ 403/132 |
| 4,066,231 A | | 1/1978 | Bahner et al. .............. 248/13 |
| 4,222,680 A | | 9/1980 | Browing ................... 403/56 |
| 4,225,258 A | | 9/1980 | Thompson ................. 403/56 |
| 4,307,864 A | | 12/1981 | Benoit .................... 248/221.3 |
| 4,461,284 A | | 7/1984 | Fackler .................... 128/20 |
| 4,491,435 A | | 1/1985 | Meier ...................... 403/55 |
| 4,585,197 A | | 4/1986 | Liautaud et al. ......... 248/288.5 |
| 4,620,813 A | | 11/1986 | Lacher ..................... 403/93 |
| 4,796,508 A | | 1/1989 | Hoshino .................. 248/188.5 |
| 4,842,308 A | | 6/1989 | Spotts ..................... 285/261 |
| 4,872,630 A | | 10/1989 | Cooper ................... 248/278 |
| 5,071,279 A | | 12/1991 | Rustrom .................. 403/114 |
| 5,092,551 A | | 3/1992 | Meier ..................... 248/276 |
| 5,251,859 A | | 10/1993 | Cyrell et al. ............. 248/288.3 |
| 5,270,911 A | | 12/1993 | Malica et al. ............ 362/396 |
| 5,412,035 A | | 5/1995 | Schmitt et al. ............ 525/93 |
| 5,419,522 A | | 5/1995 | Luecke et al. .......... 248/288.5 |
| 5,588,767 A | * | 12/1996 | Merlo ...................... 403/103 |
| 5,845,885 A | | 12/1998 | Carnevali ............... 248/118.1 |
| 5,897,417 A | * | 4/1999 | Grey ....................... 403/340 |
| 5,937,881 A | | 8/1999 | Villa ....................... 135/20.1 |
| 6,109,815 A | * | 8/2000 | Merlo ...................... 403/103 |

* cited by examiner

*Primary Examiner*—Ramon O. Ramirez
*Assistant Examiner*—Kofi Schulterbrandt
(74) *Attorney, Agent, or Firm*—Charles J. Rupnick (57) ABSTRACT

A positively-positionable mounting apparatus having a ball mount, a multisided positionable mount, and a coupler. The coupler includes two relatively rigid arm members and a clamp structured to secure the arm members together in an operatively juxtaposed configuration. Each of the arm members is formed with a part hemispherical socket adjacent to a first end, the socket structured to cooperate with the ball mount to form a securely positionable ball-and-socket assembly. Each of the arm members is also formed with a multisided partial collar adjacent to a second end, the partial collar structured to cooperate with the multisided positionable mount to form a positively-positionable wheel-and-axle assembly.

28 Claims, 6 Drawing Sheets

POSITIVELY-POSITIONABLE MOUNTING APPARATUS

The present application is related to application Ser. No. 09/855,171 entitled "Geodesic Mounting Apparatus" filed on the same day herewith in the name of the same named inventor and is incorporated in its entirety herein by reference.

BACKGROUND OF THE INVENTION

The present invention relates generally to flexible mounting apparatus and particularly, to molded plastic interconnecting ball and socket elements in combination with a positively-positionable mountable base and coupler interconnected thereto.

Various couplers and especially those of ball and socket variety are generally known in this art. However, except for the inventor's own ball-and-socket universally positionable mounting device disclosed in U.S. Pat. No. 5,845,885, the complete disclosure of which is incorporated herein by reference, the known couplers typically hold by friction and are prone to various degrees of slippage under load.

SUMMARY OF THE INVENTION

The present invention is a positively-positionable mounting apparatus having a ball mount, a multisided positionable mount, and a coupler. The coupler includes two relatively rigid arm members and a clamp structured to secure the arm members together in an operatively juxtaposed configuration. Each of the arm members is formed with a part hemispherical socket adjacent to a first end, the socket structured to cooperate with the ball mount to form a securely positionable ball-and-socket assembly. Each of the arm members is also formed with a multisided partial collar adjacent to a second end, the partial collar structured to cooperate with the multisided positionable mount to form a positively-positionable wheel-and-axle assembly.

According to one aspect of the invention, the ball mount is a part-spherical ball mount formed of a radially compressible material, and the part hemispherical sockets are structured to be secured together around the part-spherical ball mount by the clamp and deform the part-spherical ball mount.

According to another aspect of the invention, the ball mount is a second multisided positionable mount, such as a partial geodesic sphere, and the part hemispherical sockets are structured with internal contours that cooperate with the second multisided positionable mount.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

In the Figures, like numerals indicate like elements.

Figure 1A:
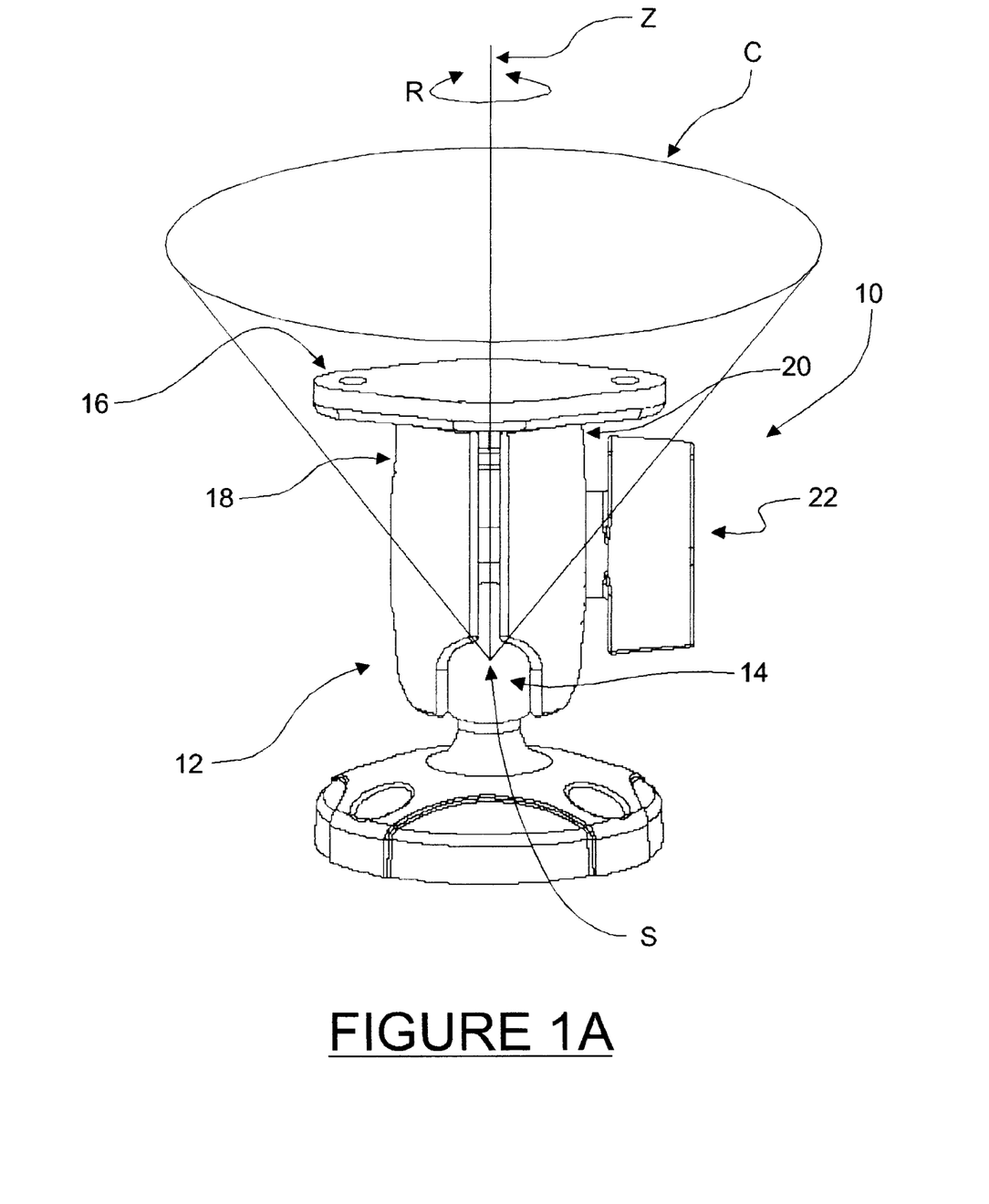
FIG. 1A is an isometric view illustrating one embodiment of the multi-positionable mounting device of the present invention.

FIG. 1A illustrates one embodiment of the positively-positionable mounting apparatus of the invention. As illustrated in FIG. 1, the mounting apparatus 10 is configured as a coupler 12 simultaneously gripping a ball mount 14 at one end and a positively-positionable mount 16 at the opposite end. The coupler 12 is a split arm assembly formed of a pair of relatively rigid arm members 18 and 20 secured together by, for example, a threaded clamp assembly 22.

The ball mount 14 and a first end portion of the coupler 12 together form a universally positionable ball-and-socket assembly, wherein portions of the arm members 18 and 20 are configured as operatively juxtaposed socket sections structured to fit securely around the ball mount 14. The engaged clamp assembly 22 locks the coupler 12 in a fixed orientation with the ball mount 14 by conforming the pressure deformable material of which the ball mount 14 is composed to the internal contours of the arm members 18 and 20. When the clamp assembly 22 is released, the coupler 12 is able to pivot about the ball mount 14 in a continuous conical section C having its apex at the spherical center S of the ball mount 14. The coupler 12 is simultaneously rotatable in a continuous circumvolution R about the vertical axis Z of the ball mount 14.

The positively-positionable mount 16 and a second end portion of the coupler 12 together form a wheel-and-socket assembly, wherein portions of the arm members 18 and 20 are configured as operatively juxtaposed socket sections structured to fit around both a multisided axle portion of the positively-positionable mount 16 and around a wheel portion fixed to the end of the axle portion. The released clamp assembly 22 also permits the coupler 12 to rotate in a continuous circumvolution R about the vertical axis Z of the axle and wheel portions of the positively-positionable mount 16. The engaged clamp assembly 22 locks the coupler 12 in a fixed orientation with the positively-positionable mount 16 in one of several consecutive positively locking positions. The clamped coupler 12 thus locks each of the ball mount 14 and the positively-positionable mount 16 in a fixed orientation with the other.

Figure 1B:
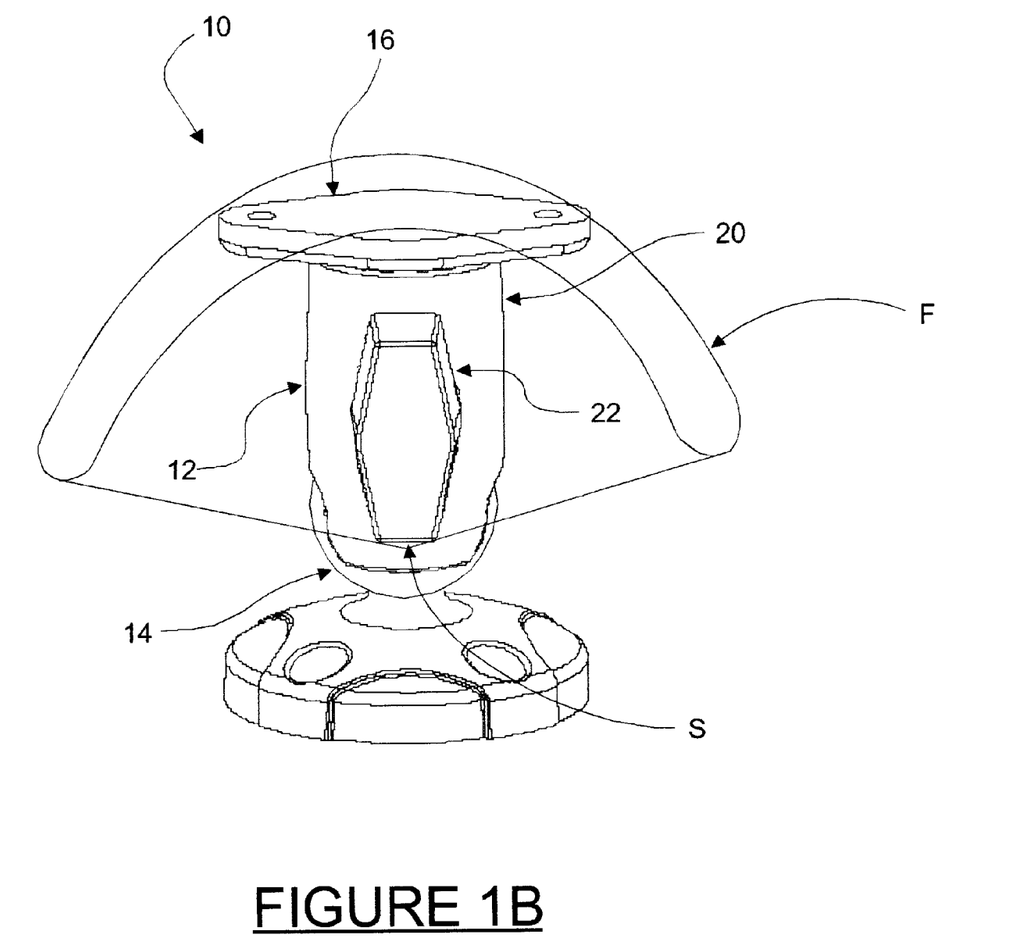
FIG. 1B is another isometric view illustrating one embodiment of the multi-positionable mounting device of the present invention.

FIG. 1B illustrates one embodiment of the positively-positionable mounting apparatus of the invention, wherein the first end portion of the coupler 12 is relieved to permit extended rotation about the ball mount 14 beyond the continuous conical section C, illustrated in FIG. 1A. In FIG. 1B, reliefs of the coupler 12 permits additional rotation in a fan-shaped section F having its apex at the spherical center S of the ball mount 14.

Figure 2A:
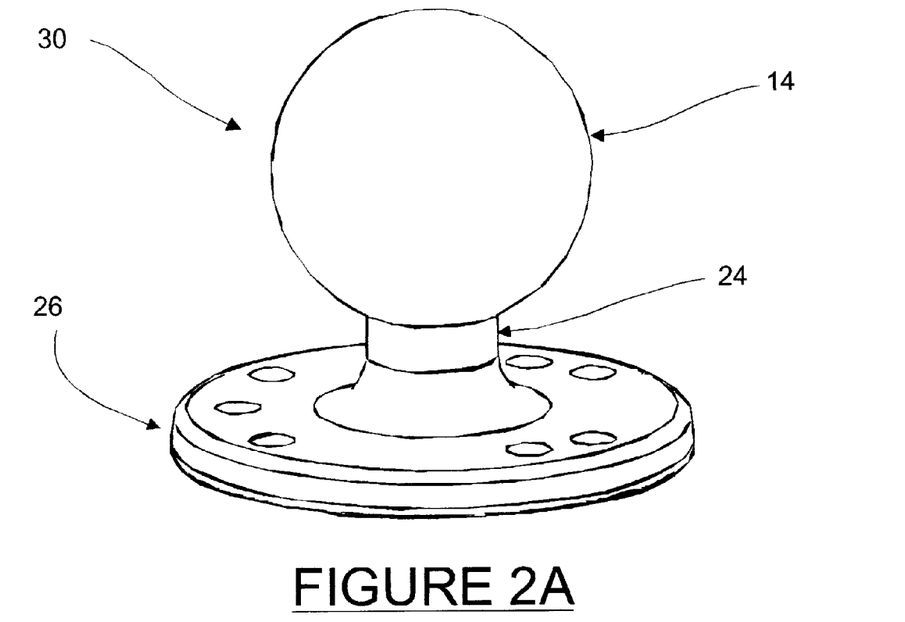
FIG. 2A illustrates one embodiment of the ball mount of the invention.

FIG. 2A illustrates one embodiment of the ball mount 14 of the invention. The ball mount 14 is formed on a cylindrical rod 24 projecting from a mounting base 26. The ball mount 14, rod 24 and base 26 together form a ball mount assembly 30. The ball mount 14 is a substantially smooth, part spherical-shaped member formed of a pressure deformable, resilient elastomeric material, which renders part spherical the ball mount 14 relatively radially compressible. The ball mount 14 is structured for attachment of an external device. The ball mount 14 is, for example, similar to the radially compressible coupling member described in above incorporated U.S. Pat. No. 5,845,885.

The pressure deformable material of which the ball mount 14 is composed permits its part-spherical shape to be deformed to conform to the internal contours of the arm members 18 and 20 when sufficient compressive pressure is applied. The pressure is applied by the clamp assembly 22. The resilient nature of the material causes it to resume its original part spherically-shaped configuration when the clamp assembly 22 is released and the compressive pressure is removed.

Figure 2B:
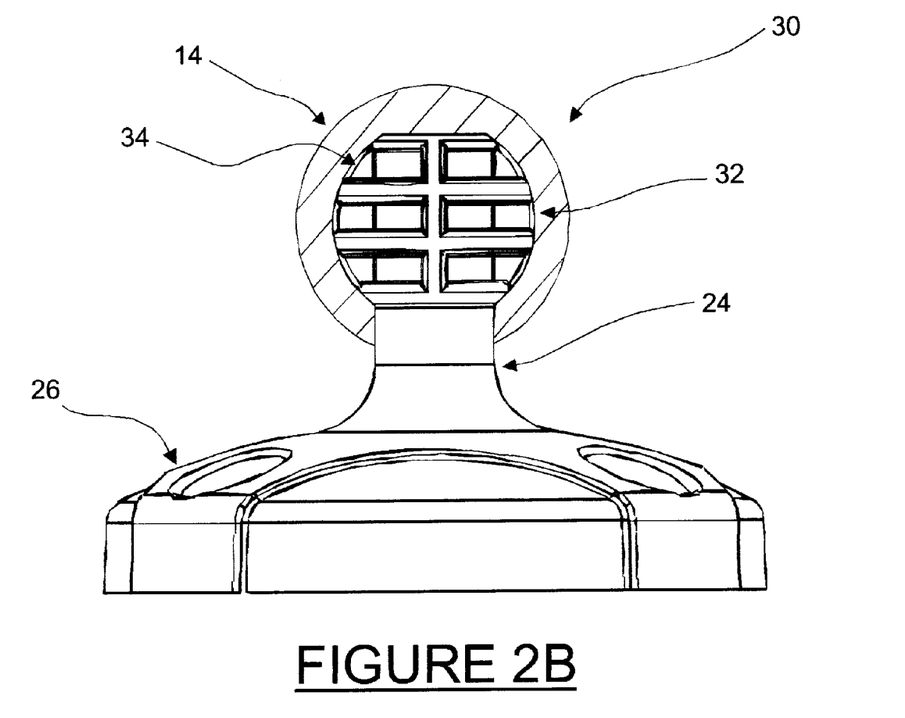
FIG. 2B illustrates one embodiment of the structure of the ball mount assembly of the invention showing the base and pedestal through a cut-away of the ball mount.

FIG. 2B illustrates one embodiment of the structure of the ball mount assembly 30 showing the base 26 and the rod 24 through a cut-away of the ball mount 14. The base 26 and the columnar rod 24 projecting from it are integrally formed of a relatively rigid material, such as a metal or hard plastic. The end of the rod 24 distal from the base 26 is integrally formed with a skull portion 32 that is configured for gripping a portion of elastomeric material of the ball mount 14 formed thereon. The configuration of skull portion 32 is not critical and will likely vary considerably when the invention is practiced by different manufactures.

The skull portion 32 is optionally formed having a generally spherical shape. Optionally, a network of horizontal and vertical gripping elements 34 is formed in reliefs on the surface of the skull portion 32. According to another example, the skull portion 32 is optionally formed as a cube. Other equivalent forms of the skull portion 32 include, for example, discs, blocks, cuboids, parallelepipeds, pyramids, cylinders, and spheres, all optionally knurled or formed with grooves, ridges, pockets, fingers, or other artifacts suitable for retaining the elastomeric material of the ball mount 14 in position thereon. Such configurations and other configurations suitable for the retaining skull portion 32 are considered to be equivalent configurations contemplated by the invention and falling within the scope of the invention.

The base 26 is optionally formed with a flat or planar bottom surface opposite from the ball mount 14 and may include multiple through holes for mounting screws (not shown). Other mounting configurations are also contemplated, including for example, a resilient adhesive pad, commonly known as a Pressure Sensitive Adhesive or PSA (not shown) applied between the bottom surface of the base 26 and a mounting surface.

Figure 3A:
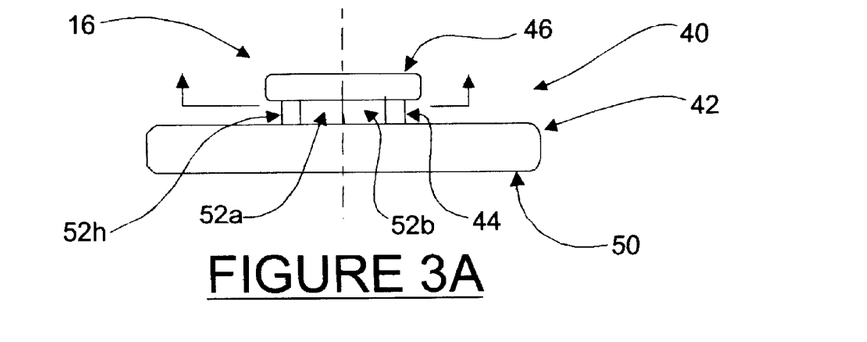
FIGS. 3A and 3B together illustrate one embodiment of the wheel-and-axle assembly of the invention formed of the positively-positionable mount formed on a mounting base.
Figure 3B:
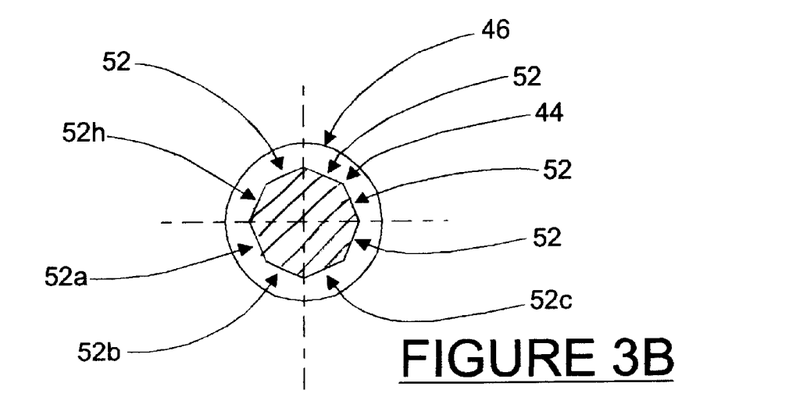

FIGS. 3A and 3B together illustrate one embodiment of the wheel-and-axle assembly 40 formed of the positively-positionable mount 16 formed on a mounting base 42. As illustrated in FIG. 3A, the positively-positionable mount 16 is shaped like a mushroom, including a multisided stem or axle portion 44 and with a disc-shaped button or wheel portion 46 mounted at one end. The axle portion 44 projects from a top surface 48 of the mounting base 42 opposite from a substantially planar mounting surface 50. The mounting base 42 and the positively-positionable mount 16 projecting from it are integrally formed of a relatively rigid material, such as a metal or hard plastic. Alternatively, some or all of the mounting base 42, the axle portion 44, and the wheel portion 46 are formed as discrete units and joined together at a later manufacturing stage.

According to one embodiment of the invention, the axle portion 44 is formed with a convex polygon shape, having multiple flat or planar surfaces 52a, 52b, 52c through 52n. The axle portion 44 is long enough to ensure that a portion of each of the arm members 18 and 20 of the coupler 12 (described below) can obtain a suitable grip between the wheel portion 46 and the top surface 48 of the mounting base 42. The disc-shaped wheel portion 46 is sufficiently thick to support a minimum predetermined load applied to the coupler 12.

FIG. 3B is a cross-section view taken through the multi-sided axle portion 44 of the positively-positionable mount 16. Each of the multiple surfaces 52a through 52n is rotated at a substantially equal angle relative to the adjacent surfaces on either side, the angles summing to 360 degrees. According to the exemplary embodiment illustrated, the axle portion 44 has a convex polygon-shape that includes eight adjacent surfaces 52. Other equivalent embodiments of the invention optionally include more or less adjacent surfaces 52. However, the adjacent surfaces 52 are sufficiently small in number to ensure positive positioning without slipping relative to the portions of the operatively juxtaposed convex polygon-shaped socket sections of the arm members 18 and 20 which are structured to fit around the convex polygon-shaped axle portion 44. Such positive positioning is ensured primarily by a length of each of the surfaces 52a through 52n that is significant relative to the thickness of the multisided axle portion 44. Accordingly, the number of adjacent surfaces 52 is in the range of about three or four to as many as about a dozen or more.

FIG. 3B also shows the underside of the disc-shaped wheel portion 46 in relation to the axle portion 44. The wheel portion 46 is formed concentric with the axle portion 44, such that the two portions 44 and 46 share a common longitudinal axis A. The disc-shaped wheel portion 46 has a sufficiently large diameter relative to the thickness of the axle portion 44 to ensure that a portion of each of the arm members 18 and 20 of the coupler 12 can obtain a suitable grip to support a minimum predetermined load applied to the coupler 12.

Figure 4:
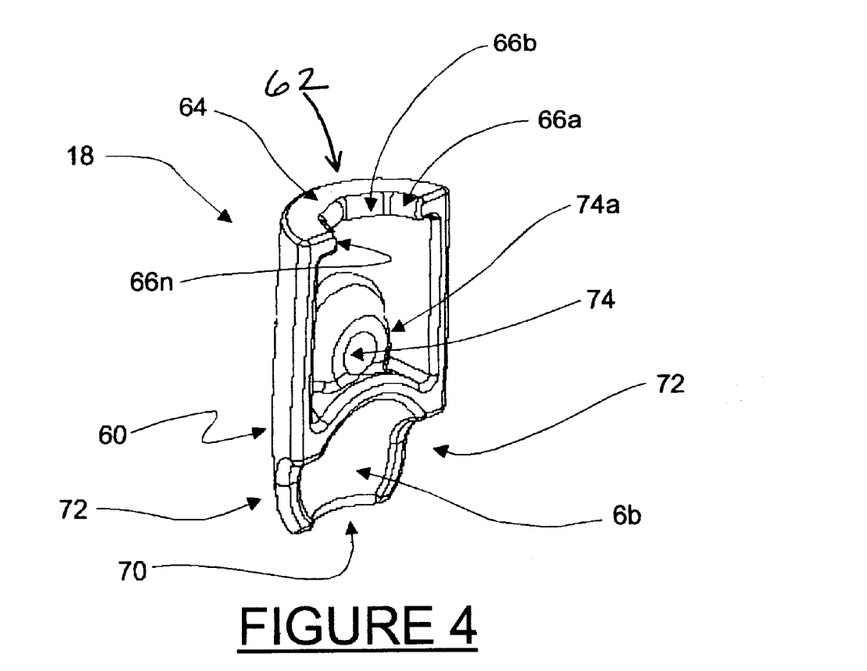
FIG. 4 illustrates one embodiment of one of the relatively rigid arm members of which the coupler of the invention is formed.

FIG. 4 illustrates one embodiment of one of the relatively rigid arm members 18 and 20 of which the coupler 12 is formed. The other arm member 20 is formed similarly to the described arm member 18. The arm members 18 and 20 are formed of a relatively rigid material, such as a metal or hard plastic. The arm member 18 is formed as a short rod 60, which is optionally hollow except for its functional features. One functional feature is a convex polygon-shaped aperture 62 formed in the face 64 at one end of the rod 60. The shaped aperture 62 is defined by multiple substantially planar interior wall surfaces 66a through 66n that are formed substantially perpendicularly to the end face 64. The wall surfaces 66a through 66n are formed to mate with the planar surfaces 52a, 52b, 52c through 52n of the axle portion 44 of the wheel-and-axle assembly 40. Thus, each wall surface 66a through 66n is rotated from the adjacent wall surfaces at an angle substantially equal to that of the angles between the planar surfaces 52a through 52n of the axle portion 44.

The end portion 64 of the arm member 18 is formed with a thickness that is at least slightly less than the length of the planar surfaces 52a through 52n of the axle portion 44, both of which are formed with sufficient length or thickness to ensure that the end portion 64 of each of the arm members 18 and 20 can support a minimum predetermined load applied to the coupler 12. The interior portion of the arm member 18 is hollowed out under the end portion 64 to provide a space large enough to accept the disc-shaped wheel portion 46 of the wheel-and-axle assembly 40. Thus, the end portion 64 fits in the gap between the mounting base 42 and the disc-shaped wheel portion 46 of the wheel-and-axle assembly 40. The matching sizes, shapes, and angles between the interior wall surfaces 66a through 66n exterior axle surfaces 52a through 52n permit the axle portion 44 to nest within the shaped aperture 62 of the arm member 18 in each of several consecutive positively locking positions.

Another functional feature is a socket-shaped cavity 68 formed at the other end of the rod 60 distal from the face 64. The socket-shaped cavity 68 is formed with a substantially smooth, part hemispherical inner peripheral surface approximately the same diameter as the pressure deformable ball mount 14. A sector or portion of the part hemispherical socket-shaped cavity 68 at the end face of the arm member 18 is removed, for example, in a plane cutting perpendicular to the length of the rod 60. The arm member 18 thus has a generally hemicircular opening 70 in the end face opposite from the end portion 64. The diameter of the hemicircular opening 70 is large enough to accept the columnar rod 24 connecting the ball mount 14 to its mounting base 26. According to one embodiment of the invention, the hemicircular opening 70 is large enough relative to the columnar rod 24 to permit the ball mount 14 to rotate into different angular positions relative to the arm members 18 and 20 when assembled into the coupler 12 of the invention, as illustrated in FIG. 1.

According to one embodiment of the invention, the part hemispherical socket-shaped cavity 68 optionally includes one or more relief or cut-out 72. The reliefs 72 are shown in FIG. 4 at the opposite extents of the part hemispherical socket-shaped cavity 68. Thus structured, the reliefs 72 in one arm member 18 cooperate with corresponding reliefs 72 in the other arm member 20 to provide side openings in the socket large enough to permit entry of the columnar rod 24. Thus, the cooperating reliefs 72 in the two arm members 18 and 20 expand the conical range of motion of the coupler 12 relative to the ball mount 14 from the conical section C, shown in FIG. 1A, into the fan-shaped section F, shown in FIG. 1B. According to one embodiment of the invention, the cooperating reliefs 72 permit the coupler 12 to rotate within the fan-shaped section F as much as +/−90 degrees or more relative to the ball mount 14.

According to one embodiment of the invention, each of the arm members 18 and 20 is also formed with an aperture 74 sized to pass a shoulder bolt or another equivalent threaded fastener, as described below. The aperture 74 is optionally surrounded by a shoulder or boss 74a that helps support the clamping force applied by the threaded clamp assembly 22 when the arm members 18 and 20 are secured together.

Assembly and Operation

Figure 5:
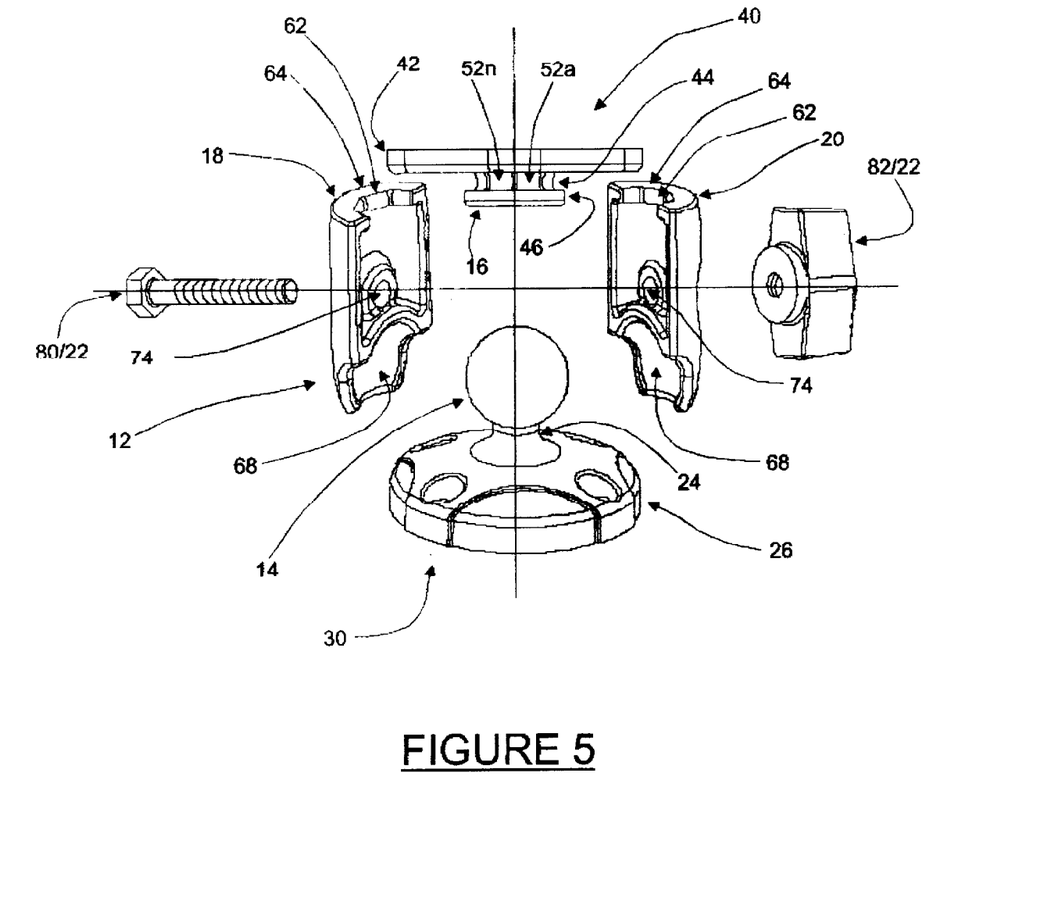
FIG. 5 illustrates one embodiment of the assembly of the positively-positionable mounting apparatus of the invention.

FIG. 5 illustrates the assembly of the positively-positionable mounting apparatus 10 according to one embodiment of the invention. Accordingly, the coupler 12 is simultaneously assembled with the ball mount 14 at one end and the positively-positionable mount 16 at the opposite end. The pair of rigid arm members 18 and 20 of the coupler 12 are secured together by, for example, a threaded shoulder bolt 80 and a wing nut 82 that combine to form the threaded clamp assembly 22, as illustrated in FIG. 1A. Alternatively, the clamp assembly 22 is formed with either a cam or another over-center clamp (not shown) that may include means, such as threaded means, for adjusting the clamping pressure exerted upon the rigid arm members 18 and 20.

During assembly, the pair of rigid arm members 18 and 20 are operatively juxtaposed to simultaneously form one socket section structured to fit securely around the ball mount 14 and another socket section structured to fit securely around the positively-positionable mount 16. The bolt 80 and nut 82 clamp the arm members 18 and 20 securely around both the ball mount 14 and the positively-positionable mount 16 in any of a variety of relative orientations. The coupler 12 can be oriented anywhere within the conical section C or the fan-shaped section F, as illustrated in FIGS. 1A and 1B, and can be rotated throughout a full 360 degrees about the axis Z of the of the ball mount 14. Simultaneously, the coupler 12 can be oriented in a fixed orientation with the positively-positionable mount 16 in one of several consecutive positively locking positions.

The shaped apertures 62 of the pair of operatively juxtaposed rigid arm members 18 and 20 cooperate to form a convex polygon-shaped collar around the positively-positionable mount 16 at one end of the coupler 12. The planar surfaces 52a through 52n of the axle portion 44 coordinate with the planar wall surfaces 66a through 66n of the shaped aperture 62 to orient the coupler 12 in any of the several relative positively locking positions. While the axle portion 44 is nested within the shaped apertures 62, the disc-shaped wheel portion 46 is fitted within the hollowed out socket portion of the arm members 18 and 20 and captured behind the end face 64.

The shaped apertures 62 of the pair of operatively juxtaposed rigid arm members 18 and 20 also coordinate to form a collar around the ball mount 14 at the other end of the coupler 12. The cylindrical rod 24 between the ball mount 14 and the mounting base 26 cooperates with the generally circular openings 70 in the pair of arm members 18 and 20 to orient the coupler 12 in any of the several relative locking positions within the conical section C or the fan-shaped section F.

The operatively juxtaposed rigid arm members 18 and 20 are clamped together by the bolt 80 passing through the respective apertures 74 and threading the nut 82 onto the bolt 80. Clamping pressure is applied by tightening the head of bolt 80 and face of the nut 82 against the outer surfaces of the respective arm members 18 and 20. The clamping pressure can thus be applied in stages. Applying the clamping pressure in stages causes the operative portions of the positively-positionable wheel-and-socket structure to become substantially fixed in one relative position, while the operative portions of the ball-and-socket structure remain loose and, therefore, relatively adjustable. The partially applied clamping pressure causes the multiple flat or planar surfaces 52a through 52n of the axle portion 44 of the positively-positionable mount 16 to nest with the corresponding planar wall surfaces 66a through 66n of the shaped aperture 62. The partially applied clamping pressure thus securely orients the coupler 12 relative to the mounting base 42 of the wheel-and-axle assembly 40.

Continued tightening of the nut 82 onto the bolt 80 increases the applied clamping pressure. The increased clamping pressure brings the inner peripheral surfaces of the socket-shaped cavities 68 into snug contact with the ball mount 14, such that motion of the coupler 12 relative to the mounting base 26 of the ball mount assembly 30 becomes more difficult. When forced together across the deformable ball mount 14 by tightening the nut 82 onto the bolt 80, the inner peripheral surfaces of the part hemispherical socket-shaped cavities 68 are forced closer together than the unconstrained diameter of the deformable ball mount 14. Firmly tightening the nut 82 onto the bolt 80 applies sufficient clamping pressure between the cooperating socket-shaped cavities 68 and the pressure deformable ball mount 14 to deform the normally spherical shape of the ball mount 14. The coupler 12 thus interlocks the ball mount 14 in a relative angular orientation with the arm members 18 and 20 by conforming the pressure deformable ball mount 14 to the inner peripheral surfaces of the socket-shaped cavities 68. The firmly applied clamping pressure thus securely orients the coupler 12 relative to the mounting base 26 of the ball mount assembly 30. Thus deformed, the ball mount 14 is substantially immovably secured relative to the socket-shaped cavities 68 and the coupler 12.

Upon partial release of the clamping force, the ball mount 14 resumes its original part spherical-shaped configuration. In such uncompressed and part spherical condition, the ball mount 14 is again angularly and rotationally rotatable relative to the mating concavely-shaped socket surfaces 68 of the arm members 18 and 20. The ball mount 14 is optionally angularly and/or rotationally rotated to a different orientation relative to the coupler 12. The pressure is again applied by the clamp assembly 22 to the ball mount 14. The pressure again relatively radially compresses the pressure deformable elastomeric material into a shape that mates with the inner peripheral surfaces of the socket-shaped cavities 68. The ball mount 14 and the attached mounting base 26 are thereby again locked in a fixed angular and rotational orientation with the coupler 12.

Alternative Embodiments

Figure 6:
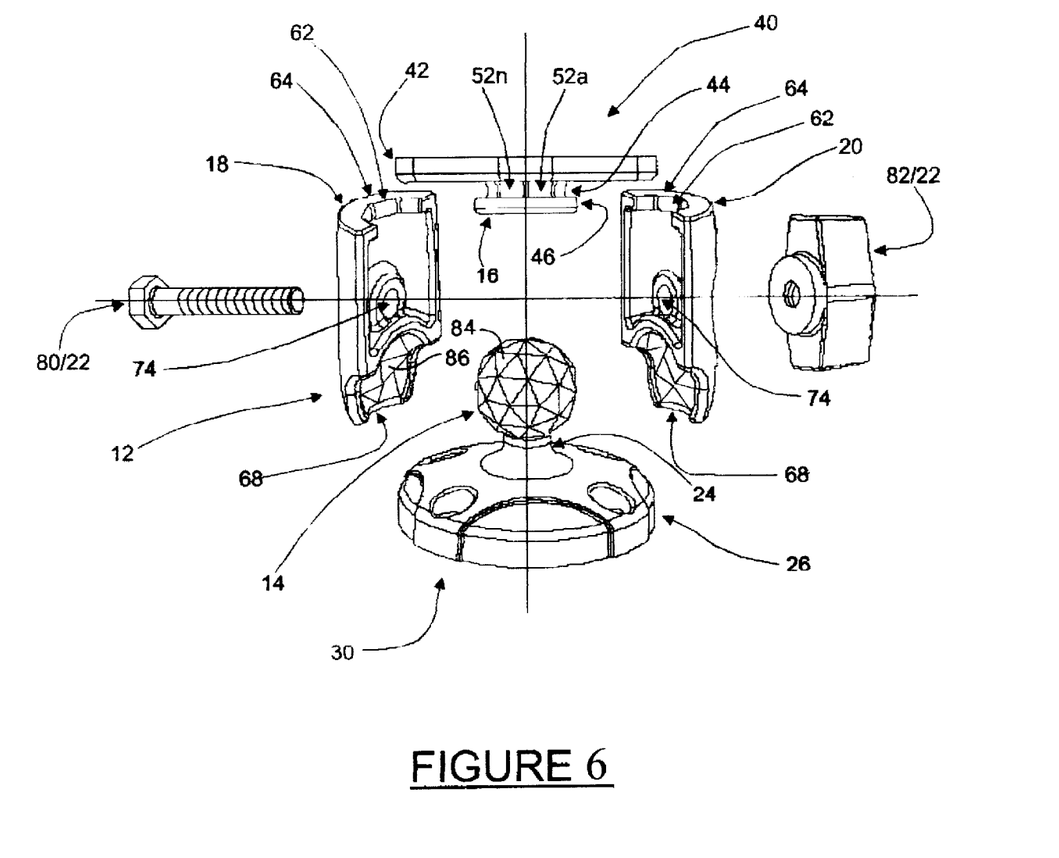
FIG. 6 illustrates one alternative embodiment of the invention utilizing the wheel-and-axle assembly of the invention in combination with the ball-and-socket assembly having a geodesic sphere substituted for the ball mount.

FIG. 6 illustrates one alternative embodiment of the invention wherein the ball mount 14 of the positionable ball-and-socket assembly is formed as a partial geodesic sphere from a relatively rigid material, such as hard plastic or metal. The socket-shaped cavities 68 of the arm members 18 and 20 are formed with internal contours that match the geodesic sphere-shape of the alternative ball mount 14.

According to the alternative embodiment of the invention illustrated in FIG. 6, the ball mount 14 is formed as a partial geodesic sphere, i.e., a part spherical body having a surface that is formed with a plurality of discrete substantially planar, triangularly-shaped areas 84 intersecting at angular joints. Each triangular area 84 is formed as a substantially planar surface oriented perpendicularly to a radius from a spherical center point of the geodesic ball mount 14. Each triangular area 84 is one segment of the 3-dimensional geodesic ball mount 14.

The concavely-shaped internal socket surfaces 68 of the arm members 18 and 20 are formed with inner surfaces configured to mate with the facets 84 formed on the surface of the geodesic ball mount 14. The internal socket surfaces 68 of the arm members 18 and 20 are formed with a plurality of substantially planar, triangular areas 86 that are substantially matched in size, shape and relative angular orientation to the triangular areas 84 on the surface of the geodesic ball mount 14.

The geodesic ball mount 14 is orientable relative to the arm members 18 and 20 in multiple discrete positions. In each of the multiple discrete positions, triangular areas 84 mate in contiguous contact with matching triangular areas 86 forming the interior socket surfaces 68, with the angular joints at the intersections between adjacent triangular areas 84 nested in mating angular joints between the matching triangular areas 86. Each of the multiple discrete positions into which the geodesic ball mount 14 is orientable relative to the arm members 18 and 20 is angularly rotated relative to each of the other multiple adjacent discrete positions.

Adjacent discrete positions are relatively rotated to the same degree as each of the triangular areas 84 forming the surface of the geodesic ball mount 14 is rotated relative to each of the other triangular areas 84. The degree of angular rotation between adjacent discrete positions is therefore a function of the number of triangular areas 84 forming the surface of the geodesic ball mount 14, and the rotational angle between adjacent triangular areas 84. Greater numbers of triangular areas 84 result in greater numbers of adjacent discrete positions with smaller angles of rotation therebetween. Smaller numbers of triangular areas 84 result in smaller numbers of adjacent discrete positions with larger angles of rotation therebetween.

Assembly and operation of the mounting apparatus 10 having the ball mount 14 formed as a geodesic ball mount 14 is substantially identical to the assembly and operation described above for use with the radially compressible part-spherical the ball mount 14, except that the desired orientation between the geodesic ball mount 14 and the arm members 18 and 20 is obtained by shifting between adjacent discrete positions, and tightening the nut 82 onto the bolt 80 immovably secures the multiple facets 84 relative to mating facets 86 on the concavely-shaped internal socket surfaces 68.

The geodesic ball mount 14 is embodied in any number of 3-dimensional, multifaceted forms. The embodiment of the invention shown in FIG. 6 and described herein is only one example and is not intended to limit the scope of the invention in any way. According to the one exemplary embodiment of the invention, the geodesic ball mount 14 is any one of a 3-dimensional icosahedron having twenty triangular facets 84, a 3-dimensional icositetrahedron having twenty-four triangular facets 84, or another roughly spherical, 3-dimensional body having a plurality of triangular facets 84, and other equivalents thereof. Similarly, the internal socket surfaces 68 are formed to match the alternative icosahedronal, icositetrahedronal, or other triangularly faceted shape of the alternative geodesic ball mount 14.

Furthermore, the facets 84 of the geodesic ball mount 14 are alternatively 3-dimensional rather than planar. Accordingly, the facets 84 form such alternative surfaces as diamond or pyramid-shaped surfaces and other equivalent multi-surface shapes. Alternatively-shaped facets 84 are arranged either convexly or concavely relative to the geodesic ball mount 14. That is, the alternatively shaped facets 84 are formed either as projections from the surface of geodesic ball mount 14 or as indentations or depressions therein. Similarly, the internal socket surfaces 68 are formed to match the alternative convexly or concavely faceted shape of the alternative geodesic ball mount 14.

Such equivalent configurations of the geodesic ball mount 14 and the mating surfaces 68 of the arm members 18 and 20 are considered equivalent and within the scope of the claimed invention.

While a preferred embodiment of the invention has been illustrated and described, it will be appreciated that various changes can be made therein without departing from the spirit and scope of the invention. For example, the axle portion 44 of the positively-positionable mount 16 and the collar formed by the operatively juxtaposed rigid arm members 18 and 20 are optionally formed with cooperating regular concave polygon shapes, such as star shapes. Alternatively, the axle portion 44 and the collar portion of the coupler 12 are formed with inwardly (concave) or outwardly (convex) curved surfaces, rather than the planar surfaces described above.

What is claimed is:

1. A positively-positionable mounting apparatus, comprising:
   a ball mount;
   a multisided positionable mount; and a coupler having first and second relatively rigid arm
  members and a clamp structured to secure together the
  arm members in an operatively juxtaposed
  configuration, each of the arm members formed with:
  (a) a part hemispherical socket adjacent to a first end,
    the socket structured to cooperate with the ball
    mount to form a securely positionable ball-and-
    socket assembly, and
  (b) a multisided part collar adjacent a second end, the
    part collar structured to cooperate with the multi-
    sided positionable mount to form a positively-
    positionable wheel-and-axle assembly.

2. The mounting apparatus of claim 1, wherein the ball mount is a part-spherical ball mount formed of a radially compressible material.

3. The mounting apparatus of claim 2, wherein the part hemispherical sockets are structured to be secured together around the part-spherical ball mount by the clamp and deform the part-spherical ball mount.

4. The mounting apparatus of claim 1, wherein:
the ball mount is a multisided positionable ball mount, and
the part hemispherical sockets are structured with internal contours that cooperate with the multisided positionable ball mount.

5. A positively-positionable mounting apparatus, comprising:
a ball mount;
a multisided positionable mount comprising a disc-shaped wheel portion mounted on a multisided axle portion; and
a coupler having first and second relatively rigid arm members and a clamp structured to secure together the arm members in an operatively juxtaposed configuration, each of the arm members formed with:
  (a) a part hemispherical socket adjacent to a first end, the socket structured to cooperate with the ball mount to form a securely positionable ball-and-socket assembly, and
  (b) a multisided part collar adjacent a second end, the multisided part collar of each of the arm members being structured to cooperate with the multisided axle portion of the multisided positionable mount to form a positively-positionable wheel-and-axle assembly.

6. The mounting apparatus of claim 5, wherein:
the ball mount is shaped as a partial geodesic sphere, and
the part hemispherical sockets are structured with internal facets that cooperate with the shape of the partial geodesic sphere to obtain a plurality of discrete relative orientations.

7. The mounting apparatus of claim 5, wherein:
the multisided axle portion is formed with a convex polygon shape; and
the multisided part collar of each of the arm members is structured with a part convex polygon shape.

8. The mounting apparatus of claim 7, wherein:
the multisided axle portion is formed having a first predetermined length; and
the multisided part collar of each of the arm members is formed having a second predetermined length shorter than the first predetermined length.

9. The mounting apparatus of claim 7, wherein the multisided axle portion is formed having sides of substantially equal lengths, each side rotated at substantially equal angles from adjacent sides.

10. The mounting apparatus of claim 9, wherein the multisided axle portion is formed having from four to twelve sides.

11. A positively-positionable mounting device, comprising:
a ball mount;
a multisided positively-positionable mount;
a coupler formed as a split arm assembly having a pair of relatively rigid arm members, each of the arm members formed with:
  (a) a part hemispherical socket adjacent a first end, the socket sized to conform to the ball mount, and
  (b) a multisided part collar adjacent a second end, the part collar structured to conform to the positively-positionable mount; and
a clamp assembly structured to secure together the pair of relatively rigid arm members in an operatively juxtaposed configuration with the part hemispherical sockets cooperating with the ball mount to form a positionable ball-and-socket assembly, and simultaneously the multisided part collars cooperating with the multisided positively-positionable mount to form a positively-positionable wheel-and-axle assembly.

12. The mounting device of claim 11, wherein:
the ball mount is a multi-faceted, positively-positionable mount, and
the part hemispherical sockets are structured with multi-faceted internal contours that are sized and shaped to conform to the multi-faceted, positively-positionable mount.

13. The mounting device of claim 11, wherein the ball mount is formed of a radially compressible material.

14. The mounting apparatus of claim 13, wherein the clamp assembly is structured to secure together the part hemispherical sockets of the pair of relatively rigid arm members in the operatively juxtaposed configuration with sufficient force to conform the radially compressible material of the ball mount to the part hemispherical sockets, thereby interlocking the ball mount with the coupler.

15. The mounting device of claim 14, wherein the ball mount is part of a ball mount assembly further comprising:
a mounting base; and
a pedestal projecting from the mounting base, the ball mount secured to an end of the pedestal distal from the mounting base.

16. The mounting device of claim 11, wherein the multisided positively-positionable mount further comprises a convex polygon shape having sides of substantially equal length oriented at substantially equal angles.

17. The mounting device of claim 16, wherein the convex polygon shape of the multisided positively-positionable mount is formed having a predetermined length, and
the positively-positionable mount further comprises:
  a mounting base coupled to one end of the convex polygon shape; and
  a disc-shaped wheel portion coupled to another end of the convex polygon shape opposite from the mounting base.

18. The mounting device of claim 17, wherein the multisided part collar of each of the pair of relatively rigid arm members is sized to fit between the mounting base and the wheel portion of the positively-positionable mount.

19. The mounting device of claim 18, wherein:
the ball mount is structured as a partial geodesic sphere, and the part hemispherical sockets are structured with internal facets that cooperate with the partial geodesic sphere to obtain a plurality of discrete relative orientations.

20. A multi-positionable mounting device, comprising:

a coupler formed of a pair of substantially rigid arms securable in an operatively juxtaposed configuration, the arms forming in the operatively juxtaposed configuration a first part spherical concave socket assembly including a part circular collar in a first end of the coupler, and a second part circular concave socket assembly including a convex polygon-shaped collar in a second end of the coupler;

a part-spherical ball mount sized to conform to the first part spherical concave socket assembly and substantially formed of a pressure deformable material over a substantially rigid skull portion attached to a first mounting base; and a button sized to conform to the second part circular concave socket assembly, the button attached to one end of a multisided stem structured to conform to the convex polygon-shaped collar in the second end of the coupler, the multisided stem attached at a second end to a second mounting base.

21. The device of claim 20, further comprising means for securing the rigid arms in the operatively juxtaposed configuration.

22. The device of claim 21, wherein:

the multisided stem is structured with a predetermined length and a convex polygon-shape having a predetermined number of substantially equal length planar sides rotated at a substantially equal angle to each adjacent side; and the convex polygon-shaped collar in the second end of the coupler is structured with a predetermined length that is less than the predetermined length of the stem, and is structured with a predetermined number of planar sides equal to the number of sides of the stem, the sides having a length substantially equal to the length of the sides of the stem and rotated at an angle substantially equal to the angle between the adjacent sides of the stem.

23. The device of claim 21, wherein the pressure deformable material of the part-spherical ball mount is an elastomeric material that is sufficiently resilient to resume its original part spherical-shaped configuration when a force applied by the means for securing the rigid arms in the operatively juxtaposed configuration is released.

24. A multi-positionable mounting device, comprising:

a coupler formed of a pair of substantially rigid arms securable in an operatively juxtaposed configuration, the arms forming in the operatively juxtaposed configuration a first part spherical, multi-faceted concave socket assembly including a part circular collar in a first end of the coupler, and a second part circular concave socket assembly including a convex polygon-shaped collar in a second end of the coupler;

a part-spherical, multi-faceted ball mount attached to a first mounting base, the multi-faceted ball mount sized and shaped to conform to the first part spherical, multi-faceted concave socket assembly; and a button sized to conform to the second part circular concave socket assembly, the button attached to one end of a multisided stem structured to conform to the convex polygon-shaped collar in the second end of the coupler, the multisided stem attached at a second end to a second mounting base.

25. The device of claim 24, further comprising means for securing the rigid arms in the operatively juxtaposed configuration.

26. The device of claim 25, wherein:

the multisided stem is structured with a predetermined length and a convex polygon shape having a predetermined number of substantially equal length planar sides rotated at a substantially equal angle to each adjacent side; and the convex polygon-shaped collar in the second end of the coupler is structured with a predetermined length that is less than the predetermined length of the stem, and is structured with a predetermined number of planar sides equal to the number of sides of the stem, the sides having a length substantially equal to the length of the sides of the stem and rotated at an angle substantially equal to the angle between the adjacent sides of the stem.

27. The device of claim 25, wherein the part-spherical, multi-faceted ball mount is formed of a substantially rigid material.

28. The device of claim 27, wherein the substantially rigid material is selected from the group of materials consisting of plastic, metal and glass.

\* \* \* \* \*

UNITED STATES PATENT AND TRADEMARK OFFICE
CERTIFICATE OF CORRECTION

PATENT NO.     : 6,561,476 B2
DATED          : May 13, 2003
INVENTOR(S)    : Jeffrey D. Carnevali It is certified that error appears in the above-identified patent and that said Letters Patent is hereby corrected as shown below:

<u>Column 8, line 64 - Column 9, line 12,</u>
Claim 1 should read as follows:
1. A positively-positionable mounting apparatus, comprising:
   a ball mount;
   a multisided positionable mount having a multisided axle portion; and
   a coupler having first and second relatively rigid arm members and a clamp structured to secure together the arm members in an operatively juxtaposed configuration, each of the arm members formed with:
      (a) a part hemispherical socket adjacent to a first end, the socket structured to cooperate with the ball mount to form a securely positionable ball-and-socket assembly, and
      (b) a multisided part collar adjacent a second end, the part collar being structured to cooperate with the multisided axle portion of the multisided positionable mount to form a positively-positionable assembly.

<u>Column 10,</u>
Lines 4-24, claim 11 should read as follows:
11. A positively-positionable mounting device, comprising:
   a ball mount;
   a multisided positively-positionable mount having a convex polygon shaped stem having sides of substantially equal length oriented at substantially equal angles;
   a coupler formed as a split arm assembly having a pair of relatively rigid arm members, each of the arm members formed with:
      (a) a part hemispherical socket adjacent a first end, the socket sized to conform to the ball mount, and
      (b) a multisided part collar adjacent a second end, the multisided part collar having a convex polygon shaped structured to cooperate with convex polygon shaped stem of the positively-positionable mount; and
   a clamp assembly structured to secure together the pair of relatively rigid arm members in an operatively juxtaposed configuration with the part hemispherical sockets cooperating with the ball mount to form a positionable ball-and-socket assembly, and simultaneously the multisided part collars cooperating with the multisided positively-positionable mount to form a positively-positionable wheel-and-axle assembly.

<u>Column 10, line 47 - Column 12, line 46,</u>
The claims should read as follows:
16. A positively-positionable mounting device comprising:
   a ball mount;
   a multisided positively-positionable mount comprising a convex polygon shape having a predetermined length and sides of substantially equal length oriented at substantially equal angles, the positively-positionable mount further comprising:

UNITED STATES PATENT AND TRADEMARK OFFICE
CERTIFICATE OF CORRECTION

PATENT NO.   : 6,561,476 B2
DATED        : May 13, 2003
INVENTOR(S)  : Jeffrey D. Carnevali It is certified that error appears in the above-identified patent and that said Letters Patent is hereby corrected as shown below:

<u>Column 10, line 47 - Column 12, line 46 (cont'd),</u> a mounting base coupled to one end of the convex polygon shape; and a disc-shaped wheel portion coupled to another end of the convex polygon shape opposite from the mounting base;

a coupler formed as a split arm assembly having a pair of relatively rigid arm members, each of the arm members formed with:

(a) a part hemispherical socket adjacent a first end, the socket sized to conform to the ball mount, and (b) a multisided part collar adjacent a second end, the part collar structured to conform to the positively-positionable mount; and a clamp assembly structured to secure together the pair of relatively rigid arm members in an operatively juxtaposed configuration with the part hemispherical sockets cooperating with the ball mount to form a positionable ball-and-socket assembly, and simultaneously the multisided part collars cooperating with the multisided positively-positionable mount to form a positively-positionable wheel-and-axle assembly.

17.    The mounting device of claim 16, wherein the multisided part collar of each of the pair of relatively rigid arm members is sized to fit between the mounting base and the wheel portion of the positively-positionable mount assembly.

18.    The mounting device of claim 17, wherein:
the ball mount is structured as a partial geodesic sphere, and
the part hemispherical sockets are structured with internal facets that cooperate with the partial geodesic sphere to obtain a plurality of discrete relative orientations.

19.    A multi-positionable mounting device, comprising:
a coupler formed of a pair of substantially rigid arms securable in an operatively juxtaposed configuration, the arms forming in the operatively juxtaposed configuration a first part spherical concave socket assembly including a part circular collar in a first end of the coupler, and a second part circular concave socket assembly including a convex polygon-shaped collar in a second end of the coupler;

a part-spherical ball mount sized to conform to the first part spherical concave socket assembly and substantially formed of a pressure deformable material over a substantially rigid skull portion attached to a first mounting base; and a button sized to conform to the second part circular concave socket assembly, the button attached to one end of a multisided stem structured to conform to the convex polygon-shaped collar in the second end of the coupler, the multisided stem attached at a second end to a second mounting base.

UNITED STATES PATENT AND TRADEMARK OFFICE
CERTIFICATE OF CORRECTION

PATENT NO.     : 6,561,476 B2
DATED          : May 13, 2003
INVENTOR(S)    : Jeffrey D. Carnevali It is certified that error appears in the above-identified patent and that said Letters Patent is hereby corrected as shown below:

Column 10, line 47 - Column 12, line 46 (cont'd),
20.   The device of claim 19, further comprising means for securing the rigid arms in the operatively juxtaposed configuration.

21.   The device of claim 20, wherein:
      the multisided stem is structured with a predetermined length and a convex polygon-shape having a predetermined number of substantially equal length planar sides rotated at a substantially equal angle to each adjacent side; and
      the convex polygon-shaped collar in the second end of the coupler is structured with a predetermined length that is less than the predetermined length of the stem, and is structured with a predetermined number of planar sides equal to the number of sides of the stem, the sides having a length substantially equal to the length of the sides of the stem and rotated at an angle substantially equal to the angle between the adjacent sides of the stem.

22.   The device of claim 20, wherein the pressure deformable material of the part-spherical ball mount is an elastomeric material that is sufficiently resilient to resume its original part spherical-shaped configuration when a force applied by the means for securing the rigid arms in the operatively juxtaposed configuration is released.

23.   A multi-positionable mounting device, comprising:
      a coupler formed of a pair of substantially rigid arms securable in an operatively juxtaposed configuration, the arms forming in the operatively juxtaposed configuration a first part spherical, multi-faceted concave socket assembly including a part circular collar in a first end of the coupler, and a second part circular concave socket assembly including a convex polygon-shaped collar in a second end of the coupler;
      a part-spherical, multi-faceted ball mount attached to a first mounting base, the multi-faceted ball mount sized and shaped to conform to the first part spherical, multi-faceted concave socket assembly; and
      a button sized to conform to the second part circular concave socket assembly, the button attached to one end of a multisided stem structured to conform to the convex polygon-shaped collar in the second end of the coupler, the multisided stem attached at a second end to a second mounting base.

24.   The device of claim 23, further comprising means for securing the rigid arms in the operatively juxtaposed configuration.

25.   The device of claim 24, wherein:
      the multisided stem is structured with a predetermined length and a convex polygon shape having a predetermined number of substantially equal length planar sides rotated at a substantially equal angle to each adjacent side; and

UNITED STATES PATENT AND TRADEMARK OFFICE
CERTIFICATE OF CORRECTION

PATENT NO. : 6,561,476 B2
DATED : May 13, 2003
INVENTOR(S) : Jeffrey D. Carnevali It is certified that error appears in the above-identified patent and that said Letters Patent is hereby corrected as shown below:

<u>Column 10, line 47 - Column 12, line 46 (cont'd)</u>,
the convex polygon-shaped collar in the second end of the coupler is structured with a predetermined length that is less than the predetermined length of the stem, and is structured with a predetermined number of planar sides equal to the number of sides of the stem, the sides having a length substantially equal to the length of the sides of the stem and rotated at an angle substantially equal to the angle between the adjacent sides of the stem.

26.    The device of claim 24, wherein the part-spherical, multi-faceted ball mount is formed of a substantially rigid material.

27.    The device of claim 26, wherein the substantially rigid material is selected from the group of materials consisting of: plastic, metal and glass.

Signed and Sealed this

Eleventh Day of October, 2005

JON W. DUDAS
*Director of the United States Patent and Trademark Office*